US012421993B2

(12) United States Patent
Draht et al.

(10) Patent No.: US 12,421,993 B2
(45) Date of Patent: Sep. 23, 2025

(54) ADDITIVELY MANUFACTURED COMPONENT WITH INSERT THREAD, MANUFACTURING METHOD FOR THE SAME AS WELL AS COMPONENT WITH WIRE THREAD INSERT INSTALLED IN THE INSERT THREAD

(71) Applicant: Böllhoff Verbindungstechnik GmbH, Bielefeld (DE)

(72) Inventors: Torsten Draht, Schloß Holte-Stukenbrock (DE); Joerg Moehring, Paderborn (DE); Michael Brand, Bad Driburg (DE); Dorte Trienens, Paderborn (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 296 days.

(21) Appl. No.: 17/943,595

(22) Filed: Sep. 13, 2022

(65) Prior Publication Data
US 2023/0093252 A1 Mar. 23, 2023

(51) Int. Cl.
*F16B 37/12* (2006.01)
(52) U.S. Cl.
CPC .................... *F16B 37/12* (2013.01)
(58) Field of Classification Search
CPC .. F16B 37/12; Y02P 10/25; B22F 5/06; B22F 10/28; B22F 10/36; B22F 10/385;
(Continued)

(56) References Cited

U.S. PATENT DOCUMENTS

| 2,755,699 A | * | 7/1956 | Forster | F16B 37/12 |
| | | | | 411/929.1 |
| 4,563,119 A | * | 1/1986 | Cosenza | F16B 37/12 |
| | | | | 470/905 |

(Continued)

FOREIGN PATENT DOCUMENTS

| CN | 110064755 A | 7/2019 |
| CN | 211564509 U | 9/2020 |

(Continued)

OTHER PUBLICATIONS

Grab Community Helicoil, website ('Grab-helicoil hereafter) https://grabcad.com/library/1-slash-4-20unc-helicoil-1-dot-50-s-dot-s; Jul. 11, 2011, Steve Enderby; 1/4-20UNC Helicoil 1.50—S.S. Cad model.*

(Continued)

*Primary Examiner* — Lawrence Averick
(74) *Attorney, Agent, or Firm* — Reising Ethington P.C.

(57) ABSTRACT

Additive manufacturing method of a component with a thread opening and an insert thread at its radial inner wall, for a wire thread insert to form a standard thread. A 3D component drawing includes the thread opening and the insert thread arranged in there, which is defined by $$D_{HC} \geq D_{HCmin} = d + 0.75 \times \frac{P}{\tan\left(\frac{\alpha}{2}\right)}$$

$$D_{1HC} \geq D_{1HCmin} = d + 0.125 \times \frac{P}{\tan\left(\frac{\alpha}{2}\right)}$$

$$D_{1HC} \leq D_{1HCmax} = d + 0.125 \times \frac{P}{\tan\left(\frac{\alpha}{2}\right)} + 0.373 \times P - 0.192 \times P^{1.21}$$

(Continued)

-continued $$P_{HC} = (D_{HCmin} - D_{1HCmin}) \times 1.6 \times \tan\left(\frac{\alpha}{2}\right)$$

with
- d nominal diameter of the screw thread
- α flank angle of the screw thread
- P pitch of the screw thread
- $D_{HC}$ nominal diameter of the insert thread
- $D_{HC\ min}$ smallest nominal diameter of the insert thread
- $D_{1HC}$ core diameter of the insert thread
- $D_{1HC\ min}$ smallest core diameter of the insert thread
- $D_{1HC\ max}$ largest core diameter of the insert thread
- $P_{HC}$ pitch of the insert thread.

Dimensions of the insert thread are adapted with correction factors. The drawing is converted with the adapted dimensions into a model for the component manufacturing.

13 Claims, 5 Drawing Sheets

(58) Field of Classification Search
CPC ..... B29C 64/153; B29C 64/386; B33Y 10/00; B33Y 50/02; B33Y 80/00
See application file for complete search history.

(56) References Cited

U.S. PATENT DOCUMENTS

| | | | | |
|---|---|---|---|---|
| 6,146,073 | A * | 11/2000 | Kobusch | F16B 37/12 411/929.1 |
| 6,561,913 | B2 * | 5/2003 | Giannakakos | B21F 45/16 470/25 |
| 6,726,422 | B2 * | 4/2004 | Giannakakos | F16B 37/12 411/178 |
| 6,840,728 | B2 * | 1/2005 | Giannakakos | B21F 5/00 411/13 |
| 10,507,526 | B2 * | 12/2019 | Liebl | B22F 10/366 |
| 10,968,943 | B2 * | 4/2021 | Bentrim | F16B 37/044 |
| 11,458,573 | B2 * | 10/2022 | Maurer | B23K 26/082 |
| 2001/0014263 | A1 * | 8/2001 | Giannakakos | F16B 37/12 411/432 |
| 2002/0136615 | A1 * | 9/2002 | Giannakakos | B21F 5/00 411/178 |
| 2003/0086772 | A1 * | 5/2003 | Giannakakos | F16B 33/008 411/432 |
| 2003/0190213 | A1 * | 10/2003 | Lutkus | F16B 37/12 411/178 |
| 2003/0190217 | A1 * | 10/2003 | Giannakakos | B21F 5/00 411/438 |
| 2010/0221087 | A1 * | 9/2010 | Gillis | F16B 37/12 72/371 |
| 2014/0023453 | A1 * | 1/2014 | Hollensen | F16B 37/12 411/178 |
| 2017/0282246 | A1 * | 10/2017 | Liebl | B33Y 10/00 |
| 2019/0219092 | A1 * | 7/2019 | Bentrim | F16B 37/068 |
| 2020/0269352 | A1 * | 8/2020 | Maurer | B23K 26/082 |

FOREIGN PATENT DOCUMENTS

| | | |
|---|---|---|
| DE | 102017126624 A1 | 5/2019 |
| DE | 102019002059 A1 | 8/2019 |
| EP | 3225334 B1 | 5/2019 |

OTHER PUBLICATIONS

Machinery's Handbook 30th Edition, copyright 2016, ISBN 978-0-8311-3093-0, pp. 1854-1972.*
Welding Additive Spwrirajan Sep. 14, 2022 (Year: 2022).*
ISO General Purpose Metric Screw Threads—Part 1: Nominal Sizes for Coarse Pitch Threads; DIN 13-1; Nov. 1999 (4 pages).
Unified Inch Screw Threads (UN and UNR Thread Form); The American Society of Mechanical Engineers; Sep. 30, 2004 (190 pages).

* cited by examiner

Fig. 7
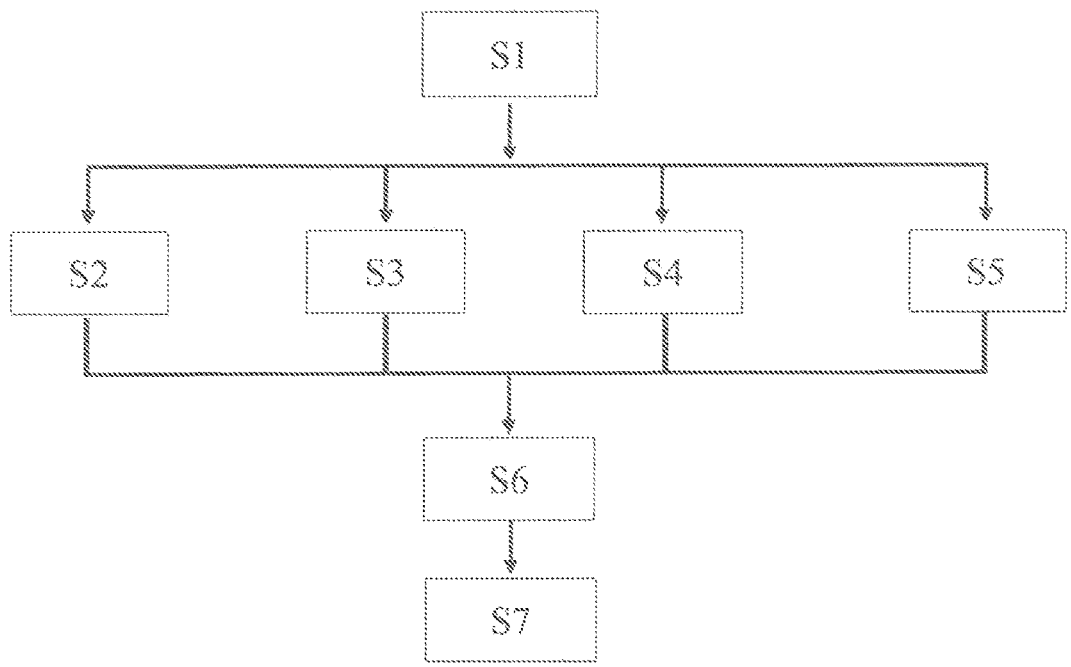
Fig. 8
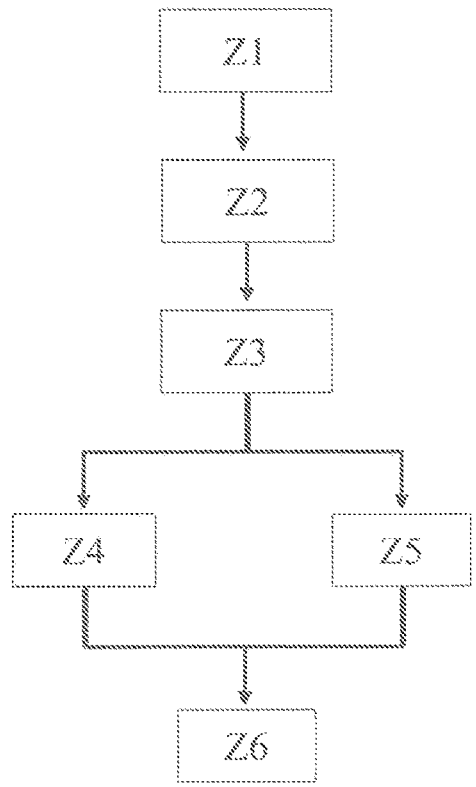
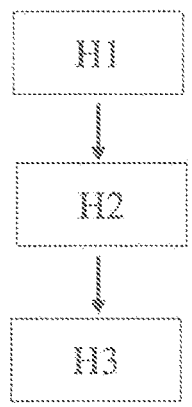
Fig. 9

ADDITIVELY MANUFACTURED COMPONENT WITH INSERT THREAD, MANUFACTURING METHOD FOR THE SAME AS WELL AS COMPONENT WITH WIRE THREAD INSERT INSTALLED IN THE INSERT THREAD

CROSS REFERENCE TO RELATED APPLICATIONS

This application claims the priority to EP Patent Application No. EP21197566.9 filed on Sep. 17, 2021, and the entire content of this priority application is incorporated herein by reference in its entirety.

TECHNICAL FIELD

The present disclosure is related to different alternatives of an additive manufacturing method of a component with a thread opening and an insert thread arranged to its radial inner wall, which is adapted to a wire thread insert to be received for the purpose of a thread reinforcement so as to jointly form a standard thread. Furthermore, the present disclosure is related to an additively manufactured component with thread opening and insert thread arranged in this thread opening, in which insert thread a wire thread insert is installed. Furthermore, the present disclosure relates to a component connection consisting of the above-described additively manufactured component with component opening and insert thread with wire thread insert, which is connected to a second component with a through-opening by means of a screw connecting these components.

BACKGROUND

Due to the layered melting process of plastic materials or metallic materials, the additive manufacturing technology (also referred to as Additive Manufacturing, in short AM) offers a great freedom in terms of the design when manufacturing objects. The layered construction or layer thickness of each AM component does, however, have an influence on the surface quality as well as the size accuracy regarding filigree structures and curvilinear shapes.

AM threads can be manufactured, they must, however, be post-processed in order to achieve the necessary accuracy of fit for a thread partner. The post-processing, in the course of which the thread is re-cut by means of machining processes, causes additional costs and decelerates the production process.

In case of materials which are difficult to machine, e.g. nickel base alloys or titanium, inserting of threads is often only possible with a tremendous additional effort. In some sectors, e.g. in medical and aerospace technology, the coolants and lubricants used during the conventional thread manufacturing as well as the arising chips are not desired. These operating materials and material residues must be removed afterwards with high effort.

In connection with the generative or additive manufacturing, DE 10 2017 126 624 A1 describes the effects of the generative manufacturing process on near-surface regions of a component. These regions which are also referred to as shell (or skin) include regions on the top, bottom or the sides of a workpiece. The near-surface regions are referred to as upskin regions (shell regions on the side of the laser beam that is incident), downskin regions (shell regions on the side away from the laser beam), and sideskin regions (shell regions that extend essentially along the direction of the laser beam). A downskin region of the component generally extends where the resulting section of the component is generated on powder in the laser beam direction. In subsequent coating processes, an upskin region of the component is covered with powder that is not irradiated. An upskin region usually forms a surface of the component on the side of the laser beam incidence. A downskin region, for example, extends along the underside of the workpiece, here in the sense of the first irradiated layers, or along the underside of an overhang region of the component. A sideskin region represents a lateral border of the component, which is given by the lateral extent of the irradiation in the layer plane. Accordingly, it borders laterally on unirradiated powder. The sideskin regions enclose the inner region of the component or a section of it. This is often referred to as the core of the component. When generally considering DE 10 2017 126 624 A1, however, the concrete, practical implementation into real geometries is missing. It can therefore not be recognized to which actual geometries with which material selection the suggested method is applicable and which advantages and disadvantages as well as approaches are connected with it.

EP 3 225 334 B1 describes a method for the additive manufacture of at least one component region of a component. It has been recognized that at least one exposure parameter of the laser depending on the angle of incidence of the laser to the surface of the component layer is adjusted as construction parameter. In this context, it is furthermore optionally recommended that depending on at least one further construction parameter from the group of component thickness, hatch distance to an adjacent exposure trace, angle of deflection of the high-energy beam with respect to a vertical axis of the component layer, overhang angle of the component layer, layer thickness of the component layer and distance to a complete volume element of the component layer are adjusted.

With respect to the additive manufacturing methods which are known in the state of the art, it is the object of at least some implementations of the present disclosure to provide an additive manufacturing method of a specific additively manufactured component with insert thread.

SUMMARY

The above object is solved by an additive manufacturing method of a component with a thread opening, by a manufacturing method of an additively manufactured component with wire thread insert as well as by an additively manufactured component and a component connection are disclosed. Advantageous embodiments and further developments of the present disclosure result from the following description, the drawings as well as the appending claims.

The present disclosure includes an additive manufacturing method of a component with a thread opening and an insert thread arranged to its radial inner wall, which is adapted to a wire thread insert to be received for the purpose of reinforcing the thread, so as to form a standard thread from the insert thread and wire thread insert. The manufacturing method includes the following steps: S1) providing a three-dimensional component drawing of the component with the thread opening and the insert thread arranged in there, which may be defined by $$D_{HC} \geq D_{HCmin} = d + 0.75 \times \frac{P}{\tan\left(\frac{\alpha}{2}\right)}$$

-continued $$D_{1HC} \geq D_{1HCmin} = d + 0.125 \times \frac{P}{\tan\left(\frac{\alpha}{2}\right)}$$

$$D_{1HC} \leq D_{1HCmax} = d + 0.125 \times \frac{P}{\tan\left(\frac{\alpha}{2}\right)} + 0.373 \times P - 0.192 \times P^{1.21}$$

$$P_{HC} = (D_{HCmin} - D_{1HCmin}) \times 1.6 \times \tan\left(\frac{\alpha}{2}\right)$$

with
- d nominal diameter of the screw thread or outer thread to be received
- α flank angle of the screw thread or outer thread to be received
- P pitch of the screw thread or outer thread to be received
- $D_{HC}$ nominal diameter of the insert thread
- $D_{HC\ min}$ smallest nominal diameter of the insert thread
- $D_{1HC}$ core diameter of the insert thread
- $D_{1HC\ min}$ smallest core diameter of the insert thread
- $D_{1HC\ max}$ largest core diameter of the insert thread
- $P_{HC}$ pitch of the insert thread S2) Adapting of dimensions of the insert thread to the additive manufacturing with the help of correction factors S3), converting the three-dimensional component drawing with the adapted dimensions into a layer model for the additive manufacturing and S4) additive manufacturing of the three-dimensional component.

When manufacturing additively manufactured components, it has become obvious that known geometries of standard threads can only be manufactured with geometric deviations that are practically inacceptable. This disadvantage is compensable by additively manufacturing an insert thread for a wire thread insert in the component instead of providing a standard thread as inner thread or outer thread in the component directly. An insert thread may have a larger nominal diameter and thus also larger geometric tolerances than a standard thread, such as than a standard inner thread or standard outer thread. In turn, larger tolerances allow a higher preciseness of the additive manufacturing of the component. Thus, an additively manufactured insert thread in combination with a wire thread insert form a conveniently usable standard thread for an inner thread or an outer thread, depending on the application case.

The above additive manufacturing method for a component may generate an insert thread in the form of an inner thread at the radial inner side of the component opening or thread opening, respectively. The constructive design and dimensioning of the inner insert thread are based on an outer thread or bolt thread, respectively, which is later intended to be screwed into and fastened in the combination of additively manufactured inner insert thread and wire thread insert positioned in there.

In order to reduce geometric deviations when additively manufacturing insert threads, prescribed geometric dimensions are adjusted. According to a configuration of the manufacturing method, the adapting of the dimensions of the insert thread may be made by expanding the nominal diameter $D_{HC}$, the core diameter $D_{1HC}$, the flank angle $\alpha_{HC}$ and the pitch $P_{HC}$.

With regard to the adapting of the dimensions, the adapting of the nominal diameter $D_{HC}$ to an additive nominal diameter $D_{AM}$, the adapting of the core diameter $D_{1HC}$ to an additive core diameter $D_{1AM}$, the adapting of the flank angle $\alpha_{HC}$ to an additive flank angle $\alpha_{AM}$ and the adapting of the pitch $P_{HC}$ to an additive pitch $P_{AM}$ may take place on the basis of the following equations:

$$D_{AM} = D_{HC} * \delta$$

$$D_{1AM} = D_{1HC} * \delta_1$$

$$\alpha_{AM} = \alpha_{HC} * \delta_\alpha$$

$$P_{AM} = P_{HC} * \delta_P$$

wherein $\delta$, $\delta_1$, $\delta_\alpha$, $\delta_P$ are correction factors for the nominal diameter, the core diameter, the flank angle and the pitch.

For executing the above adaption, it has been recognized as being advantageous that the correction factors may be limited to certain value ranges. These are summarized in the following table:

| correction factor: | value range: |
| --- | --- |
| δ | 1.04-1.25 |
| $\delta_1$ | 1.04-1.25 |
| $\delta_\alpha$ | 1.04-1.25 |
| $\delta_P$ | 1.04-1.25 |

In known industrial standards for example for Europe or the United States of America, which are mentioned later, thread geometries are defined. They stipulate which thread geometries must be provided in a thread opening in combination with a wire thread insert so as to be connectable with thread bolts of different industrial standards. In this connection, it has proven advantageous and that different correction factors may be determined for metric threads as well as for inch threads, which may be used in the USA and Great Britain.

According to a further embodiment of the manufacturing method, the above equations may be applicable for metric threads with α=60° for d=2; 2.5; 3; 3.5; 4; 4.5; 5; 6; 7; 8; 9; 10; 11; 12; 14; 16; 18; 20 [mm].

Furthermore, for metric threads with α=60°, the above equations for P=0.45; 0.5; 0.6; 0.7; 0.75; 0.8; 1; 1.25; 1.5; 1.75; 2; 2.5; 3 [mm] may be applicable.

With respect to the above explanations, the additive manufacturing method may be also applicable to a component with an inch insert thread. For inch threads with α=60°, the above equations for d=0.086; 0.099; 0.112; 0.125; 0.138; 0.164; 0.19; 0.216; 0.25; 0.3125; 0.375; 0.4375; 0.5; 0.5625; 0.625; 0.75; 0.875 [inch] are applicable.

A combination of the above values for the nominal diameter and the pitch result from the known industrial standards for thread geometries. Therefore, they do not have to be repeated at this point.

Furthermore, the present disclosure includes an additive manufacturing method of a component with a thread opening and an insert thread arranged to its radial inner wall, which is adapted to a wire thread insert to be received for the purpose of a thread reinforcement in order to form a standard thread out of the insert thread and wire thread insert. The manufacturing method includes the following steps: S1) providing a three-dimensional component drawing with the thread opening and the insert thread arranged in there, which is defined by S2) selecting geometry areas of the insert thread in the component drawing, which may be defined by $$D_{HC} \geq D_{HCmin} = d + 0.75 \times \frac{P}{\tan\left(\frac{\alpha}{2}\right)}$$

$$D_{1HC} \geq D_{1HCmin} = d + 0.125 \times \frac{P}{\tan\left(\frac{\alpha}{2}\right)}$$

-continued $$D_{1HC} \leq D_{1HCmax} = d + 0.125 \times \frac{P}{\tan\left(\frac{\alpha}{2}\right)} + 0.373 \times P - 0.192 \times P^{1.21}$$

$$P_{HC} = (D_{HCmin} - D_{1HCmin}) \times 1.6 \times \tan\left(\frac{\alpha}{2}\right)$$

with
- d nominal diameter of the screw thread or outer thread to be received
- α flank angle of the screw thread or outer thread to be received
- P pitch of the screw thread or outer thread to be received
- $D_{HC}$ nominal diameter of the insert thread
- $D_{HC\ min}$ smallest nominal diameter of the insert thread
- $D_{1HC}$ core diameter of the insert thread
- $D_{1HC\ min}$ smallest core diameter of the insert thread
- $D_{1HC\ max}$ largest core diameter of the insert thread
- $P_{HC}$ pitch of the insert thread S3) converting the three-dimensional component drawing with the selected geometry areas into a layer model for the additive manufacturing and S4) additive manufacturing of the three-dimensional component with insert thread, which may be out of an aluminum alloy, wherein the selected geometry areas of the insert thread are fused with another energy per unit length of a laser than the other areas of the component and the energy per unit length of the laser results from $$E_S = \frac{P_L}{V_s}$$

with $E_S$=energy per unit length of the laser, $P_L$=laser power and $v_S$=scan speed of the laser.

According to a manufacturing alternative of an additively formed component with insert thread in a component opening, the energy per unit length of the laser is specifically adjusted differently in certain selected geometry areas instead of using geometric correction factors when stipulating the geometry of the insert thread to be established. For this purpose, geometry areas to be solidified which face away from the incident laser beam and those facing towards the incident laser beam are impinged with different degrees by means of solidifying energy per unit length of the laser.

The laser may shine on material to be solidified in a radiation direction, with the following steps being provided: selecting Downskin thread surfaces of the insert thread which face away from the radiation direction and reducing the energy per unit length $E_S$ to be applied by the laser on the powder to be solidified.

According to a further embodiment of the manufacturing method, the latter includes the following step: reducing the energy per unit length of the laser by reducing the laser power and/or by increasing the scan speed. It has proven advantageous that the energy per unit length of the laser be reduced in case of Downskin thread surfaces of the insert thread. This may be carried out according to the following equation:

$$E_{S,down} = \frac{P_L \times \delta_L}{V_s},$$

by changing the laser power $P_L$ with the help of a correction factor of $0.7 \leq \delta_L \leq 0.99$.

The present disclosure furthermore includes a manufacturing method of an additively manufactured component with a wire thread insert comprising the following steps: providing an additively manufactured component with an insert thread according to one of the preceding alternatives and embodiments, such as with $D_{1HC} \geq d+0.46 \times P$ and rotating a wire thread insert into the insert thread of the additively manufactured component, so that the diameter of the wire thread insert may be reduced and a standard thread may be formed in the component.

In a further method step, a screw with a core diameter d may be screwed through a through opening of the additively manufactured component into the wire thread insert in the insert thread.

Furthermore, the present disclosure includes an additively manufactured component with a component opening and an insert thread arranged to an inner wall of the component opening, in which a wire thread insert is arranged, which may be an additively manufactured component according to a manufacturing method according to one of the above embodiments. According to different embodiments of the additive manufacturing method, the component is manufactured out of plastic material or of metal by means of a laser sinter method or laser melting method. Such manufacturing methods are known in the state of the art.

Furthermore, the present disclosure includes a component connection with the following features: a first additively manufactured component with an insert thread, which may be an additively manufactured component according to a manufacturing method according to the above configuration, a wire thread insert arranged in the insert thread, a second component with a through opening and a screw with a head, a shaft and a thread arranged on the shaft, wherein the shaft extends through the through opening and the thread of the shaft is screwed together with the first component via the wire thread insert that is arranged in the insert thread. The thread may have a nominal diameter d on the shaft of the screw and the insert thread has a core diameter $D_{1HC}$ according to $D_{1HC} \geq d+0.46 \times P$, wherein a flank angle α of the insert thread lies in the range from 80°>α>60°.

BRIEF DESCRIPTION OF THE DRAWINGS

Embodiments of the present disclosure will be described in more detail based on the drawings, showing.

DETAILED DESCRIPTION

Figure 1:
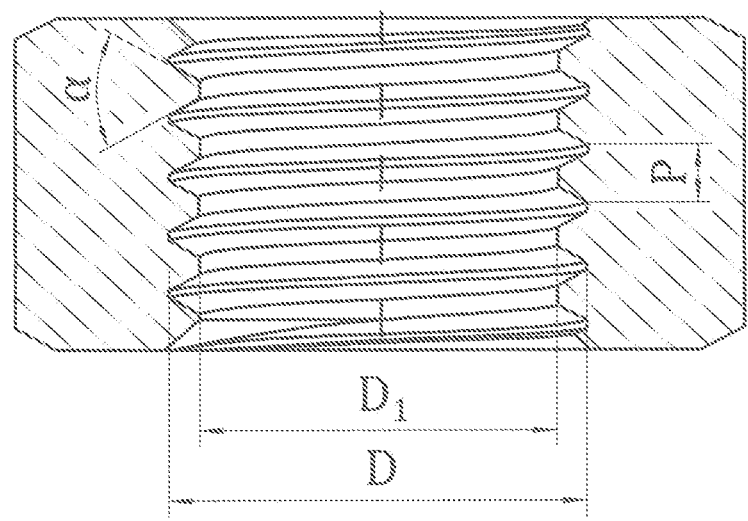
FIG. 1 an illustration of a standard inner thread in a component with geometry data, FIG. 2 an illustration of a screw with screw thread or outer thread, respectively, with geometry specifications, FIG. 3 an embodiment of an additively manufactured component in the process of the manufacturing with a component opening and an insert thread or inner thread, respectively, FIG. 4 an enlarged schematic illustration of an additively manufactured thread section, FIG. 5 an embodiment of a component composite of two components with a screw that is screwed into a component opening of an additively manufactured component having an insert thread with a wire thread insert, FIG. 6 an embodiment of a component composite of two components, in which the additively manufactured component includes a thread bolt with an insert thread as outer thread on which a wire thread insert is arranged and subsequently, a female thread element is screwed on, FIG. 7 a flow chart of a manufacturing method, FIG. 8 a flow chart of a further manufacturing method, FIG. 9 a flow chart of a further manufacturing method.
Figure 2:
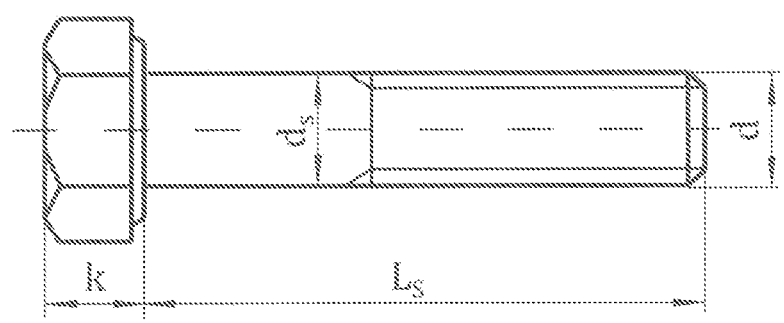

In the construction of components 10, female standard threads, i.e. an inner thread (see FIG. 1), as well as male standard threads, i.e. an outer thread (see FIG. 2) are equally used. In known application cases, a female standard thread forms an inner thread of a nut or a component opening. A male standard thread forms, for example, an outer thread on the shaft of a screw.

The accuracy to gauge of a female and a male standard thread is determined by the nominal diameter d; D; the core diameter $d_1$; $D_1$, the pitch P and the flank angle $\alpha$.

Figure 4:
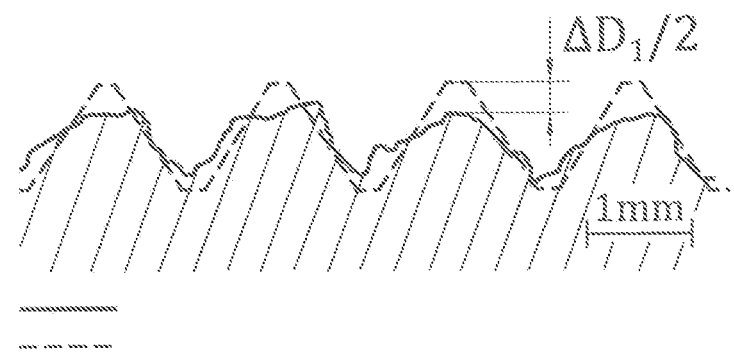

A thread outside of tolerances stipulated by standards (e.g. a metric thread) causes a threading to become impossible or insecure. As exemplary explained in FIG. 4, additive manufacturing methods sometimes deviate significantly from a target thread curve. In FIG. 4, the target thread curve is illustrated with a dashed line and the additively manufactured thread curve is illustrated with a permanent line. In case of additively manufactured components with thread, no matter if in case of additively manufactured female or male threads, an insert thread 16 is manufactured additively in/at the component 10 and is combined with a wire thread insert 30 in order to achieve a standard thread that is true to size without any post-processing. This combination of additive insert thread 16 and wire thread insert 30 forms the advantageous standard thread which is necessary for a connection.

As an initial material for the additive manufacturing of a component with insert thread, plastic materials may be used. These materials include, for example, polyamide 11, polyamide 12, polyaryl etherketone, PEEK, PA6X, polypropylene, thermoplastic elastomers and polystyrol.

Furthermore, metallic materials for the additive laser sintering or laser melting may be used for the manufacturing of the component. Weldable metallic materials with a carbon equivalent of approx. 0.2 to 0.4 may be used. Aluminum, titanium and nickel base alloys (as for example Inconel) may be used as basic materials, beside steel.

In this context, the selective laser beam melting may be an additive process.

No demands are made on a material or a shape of the wire thread insert 30 that arranged in the insert thread 16. Known wire thread inserts 30 may be used in the insert thread. Also wire thread inserts 30 with amended cross-sectional profiles may be installed in the insert thread 16 of a component opening 12, i.e. in a thread opening, or of a male component. For this purpose, the flank angle, which may abut the additively manufactured insert thread 16, of the wire thread insert 30 is enlarged or decreased. In this way, a firm fit of the wire thread insert 30 may be realized in the insert thread 16, provided that the flank angle of the insert thread 16 is also adapted to the flank angle of the wire thread insert 30.

For the construction of a component 10 to be manufactured additively, with a component opening 12, an insert thread 16 is provided at an inner wall 14 of the component opening 12. As the additive manufacturing method realizes the component 10 in a three-dimensional manner in a layer construction, the component 10 with component opening 12 and insert thread 16 is constructed in a three-dimensional model and is drawn with common drawing programs, e.g. CAD.

Figure 5:
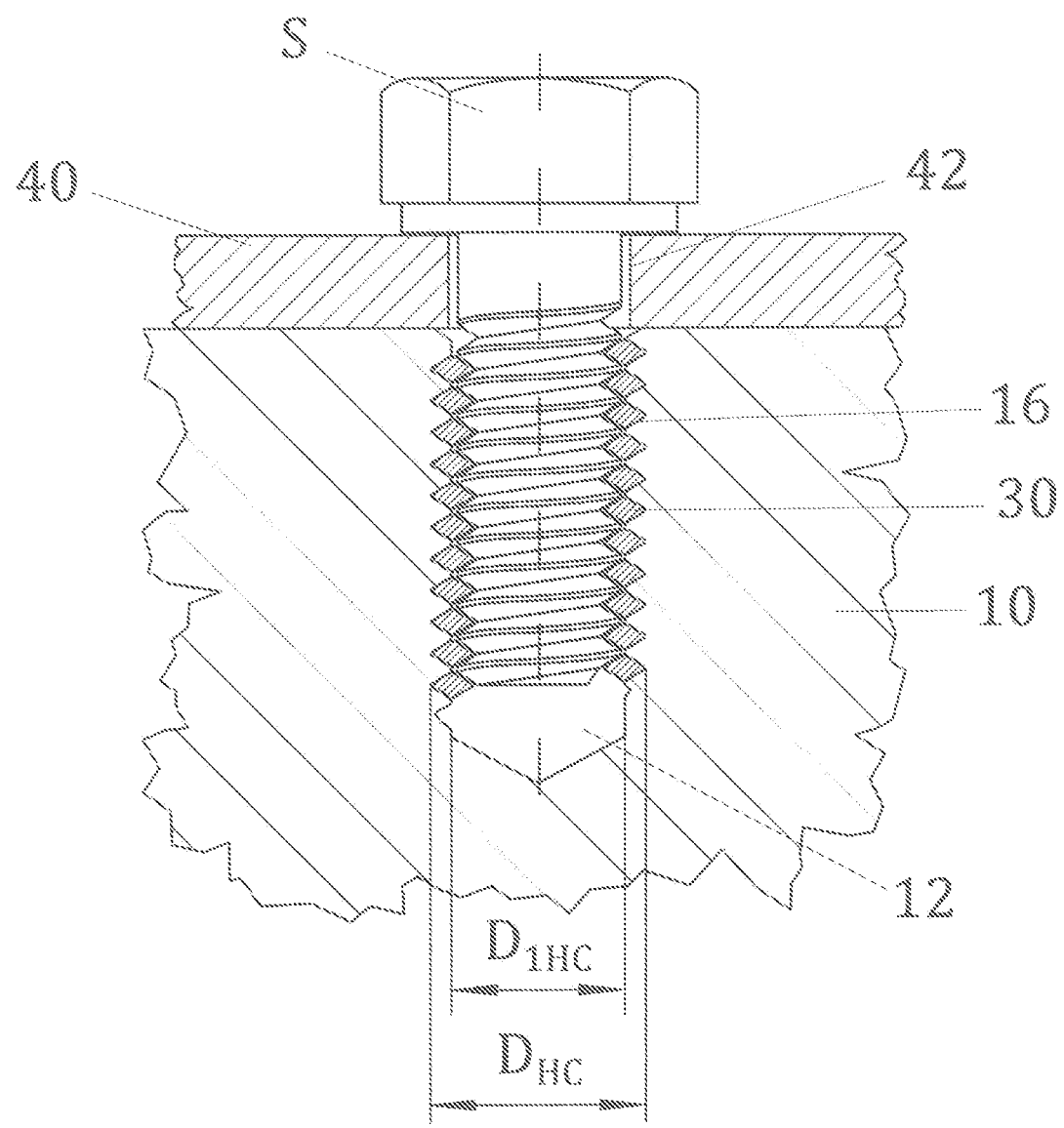
Figure 6:
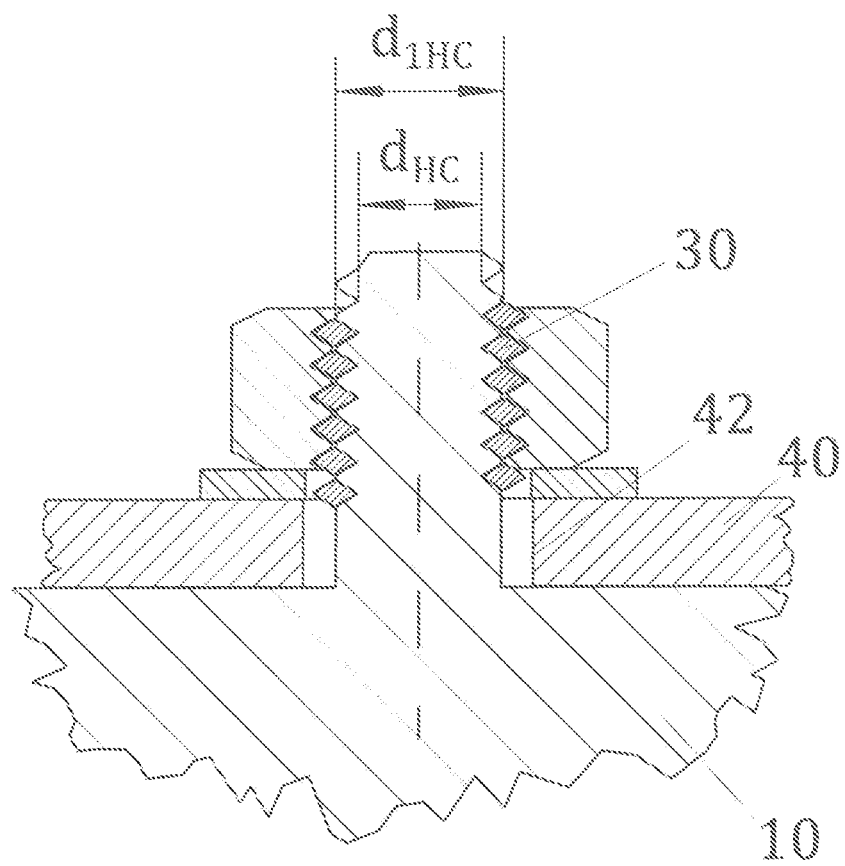

The geometry of the insert thread 16 is adapted to a wire thread insert 30. Accordingly, a standard thread for female components, i.e. an inner thread (see FIG. 5) or for male components, i.e. an outer thread (see FIG. 6), arises from a combination of insert thread 16 and wire thread insert 30.

The geometry of the insert thread 16 is defined in DIN 8140 as of September 2021. Accordingly, the following applies to the geometry of the insert thread 16 as inner thread $$D_{HC} \geq d_{HCmin} = D + 0.75 \times \frac{P}{\tan\left(\frac{\alpha}{2}\right)}$$

$$D_{1HC} \geq d_{1HCmin} = D + 0.125 \times \frac{P}{\tan\left(\frac{\alpha}{2}\right)}$$

$$D_{1HC} \leq d_{1HCmax} = D + 0.125 \times \frac{P}{\tan\left(\frac{\alpha}{2}\right)} + 0.373 \times P - 0.192 \times P^{1.21}$$

$$P_{HC} = (D_{HCmin} - D_{1HCmin}) \times 1.6 \times \tan\left(\frac{\alpha}{2}\right)$$

with
- d nominal diameter of the screw thread to be received in the inner thread
- $\alpha$ flank angle of the screw thread to be received in the inner thread
- P pitch of the screw thread to be received in the inner thread
- DHC nominal diameter of the insert thread
- DHC min smallest nominal diameter of the insert thread
- D1HC core diameter of the insert thread
- D1HC min smallest core diameter of the insert thread
- D1HC max largest core diameter of the insert thread
- PHC pitch of the insert thread Due to the application of the above definition of the insert thread 16 as inner thread in the component opening 12, the insert thread 16 for the wire thread insert 30 may increase radially by a wire thickness of the wire thread insert 30. While the diameter of the insert thread 16 is increased for the wire thread insert 30, the pitch $P_{HC}$ of the insert thread 16 remains the same compared with the corresponding standard thread of a suitable screw to be received in the wire thread insert 30, which arises from the combination of insert thread 16 and wire thread insert 30.

The above formulae may be applicable in the same way for metric standard threads to be received and for inch standard threads to be received as outer thread. For this purpose, the following sizes are used in the construction of metric insert threads 16 for the nominal diameter d:

d=2; 2.5; 3; 3.5; 4; 4.5; 5; 6; 7; 8; 9; 10; 11; 12; 14; 16; 18; 20 [mm].

In the construction of an inch insert thread 16, the following may be used for the nominal diameters:

d=0.086; 0.099; 0.112; 0.125; 0.138; 0.164; 0.19; 0.216; 0.25; 0.3125; 0.375; 0.4375; 0.5; 0.5625; 0.625; 0.75; 0.875 [inch].

The following pitch values P may be assigned to the values for the nominal diameter d of metric outer threads to be received based on DIN13-1.

P=0.45; 0.5; 0.6; 0.7; 0.75; 0.8; 1; 1.25; 1.5; 1.75; 2; 2.5; 3 [mm].

The pitch P is measured as distance between adjacent thread teeth in millimeter.

Furthermore, the flank angle $\alpha$ of $\alpha=60°$ for the values of the metric outer threads may apply.

The following pitch values P may be assigned to the values for the nominal diameter d of inch outer threads to be received, based on the Unified Thread Standard:

P=0.017857; 0.020833; 0.025; 0.025; 0.03125; 0.03125; 0.041667; 0.041667; 0.05; 0.055556; 0.0625; 0.071428; 0.076923; 0.083333; 0.090909; 0.1; 0.111111 [inch].

The pitch P as distance between adjacent thread teeth is measured in inch.

Furthermore, α corresponding to $\alpha_{HC}$=60° may apply to inch outer threads.

In order to adapt the insert thread 16 to be manufactured additively to the tolerance-afflicted additive manufacturing method in a way that a metric or inch standard thread as inner thread results which may be from the combination of insert thread 16 and wire thread insert 30 in the additively manufactured component 10, such as the geometric data nominal diameter $D_{HC}$, core diameter $D_{1HC}$, flank angle $\alpha_{HC}$ and pitch P may be adapted.

According to an embodiment of the present disclosure, adapting means that the mentioned geometric data may be each multiplied with an individual correction factor $\delta$, $\delta_1$, $\delta_\alpha$, $\delta_P$, in order to achieve an additive nominal diameter $D_{AM}$, an additive core diameter $D_{1AM}$, an additive flank angle $\alpha_{AM}$ and an additive pitch $P_{AM}$.

Expressed mathematically, this means may be:

$$D_{AM} = D_{HC} * \delta$$

$$D_{1AM} = D_{1HC} * \delta_1$$

$$\alpha_{AM} = \alpha_{HC} * \delta_\alpha$$

$$P_{AM} = P_{HC} * \delta_P$$

wherein $\delta$, $\delta_1$, $\delta_\alpha$, $\delta_P$ are corresponding correction factors for the nominal diameter, the core diameter, the flank angle and the pitch.

According to the disclosure, the mentioned correction factors $\delta$ may have the following value ranges which are used for compensating tolerances when manufacturing the additive component 10:

| correction factor | value range |
| --- | --- |
| $\delta$ | 1.04-1.25 |
| $\delta_1$ | 1.04-1.25 |
| $\delta_\alpha$ | 1.04-1.25 |
| $\delta_P$ | 1.04-1.25 |

According to the disclosure, the above-mentioned tolerance adaptions may be applicable for metric threads of the size M2 to M20 and for inch threads of 2⅞ inch.

With a further increasing nominal diameter, the tolerances increase as well. Depending on the layer thickness and orientation, deviations caused by production correspond to the admitted tolerances starting from a specific nominal diameter.

According to a further alternative of the present disclosure, an additive manufacturing method of a component 10 with a component opening 12 is provided. At the inner wall 14 of the component opening 12, the insert thread 16 is provided for a wire thread insert 30 as the inner thread, instead of a standard thread for screws S (see FIG. 2).

Figure 3:
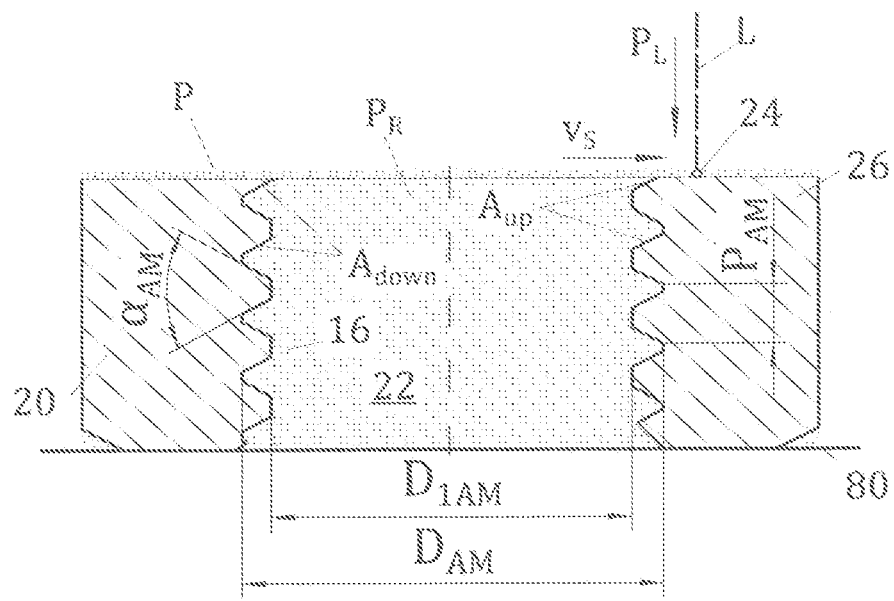

A known additive method for manufacturing the component 10 out of plastic powder or metal powder is schematically summarized in FIG. 3. This illustration may apply similarly to the above-described manufacturing method, too.

A layer of loose powder P is provided on a construction platform (80). A laser beam L shines on the powder P with a laser power $P_L$ that is adapted to the material of the powder, in order to solidify it. The laser beam L moves with a scan speed $v_S$ over the powder layer P and shines on the portions which are determined for the solidification by the layer model of the three-dimensional component drawing. With respect to FIG. 3, solidified component portions 20 as well as portions 22 with loose or non-solidified powder arise. Amounts of loose powder 22 are arranged on the solidified portions 22 so as to solidify them by means of the laser beam and to continue to construct the component 20 layer-wise by that.

The component 10 with component opening 12 and insert thread 16 as inner thread is defined in the three-dimensional component drawing according to the following formulae:

$$D_{HC} \geq d_{HCmin} = D + 0.75 \times \frac{P}{\tan\left(\frac{\alpha}{2}\right)}$$

$$D_{1HC} \geq d_{1HCmin} = D + 0.125 \times \frac{P}{\tan\left(\frac{\alpha}{2}\right)}$$

$$D_{1HC} \leq d_{1HCmax} = D + 0.125 \times \frac{P}{\tan\left(\frac{\alpha}{2}\right)} + 0.373 \times P - 0.192 \times P^{1.21}$$

$$P_{HC} = (D_{HCmin} - D_{1HCmin}) \times 1.6 \times \tan\left(\frac{\alpha}{2}\right)$$

with
- d nominal diameter of the screw thread to be received in the inner thread
- α flank angle of the screw thread to be received in the inner thread
- P pitch of the screw thread to be received in the inner thread
- $D_{HC}$ nominal diameter of the insert thread
- $D_{HC\ min}$ smallest nominal diameter of the insert thread
- $D_{1HC}$ core diameter of the insert thread
- $D_{1HC\ min}$ smallest core diameter of the insert thread
- $D_{1HC\ max}$ largest core diameter of the insert thread
- $P_{HC}$ pitch of the insert thread As the three-dimensional component drawing has been converted by means of known software into a layer model for the additive manufacturing, the component is additively manufactured based on this layer model. During the additive manufacturing, the laser beam L solidifies the powder P at a point of impact or impingement 24, by shining in with a specific energy per unit length $E_S$. The energy per unit length $E_S$ is calculated from $$E_S = \frac{P_L}{V_s}$$

with $E_S$=energy per unit length of the laser, $P_L$=laser power and $v_S$=scan speed of the laser.

The component drawing, which is then also produced as a layer model, may define geometric areas and/or surfaces of the component 10, which face toward the incoming laser beam L and which face away from the incoming laser beam L. The regions facing toward the laser beam L are referred to as Upskin regions $A_{up}$. The regions facing away from the laser beam L are referred to as Downskin regions $A_{down}$.

In the area of a Downskin region $A_{down}$, which is also referred to as bottom region of a projection in the component, the component 10 is constructed on loose powder. In this process, the heat which is thereby added to the powder via the laser beam is not led away via the solidified powder or material lying underneath. Rather, the heat must be led away via the powder bed or the loose powder, which has a lower heat conductive coefficient than solidified powder. Furthermore, added heat may be led away via the laterally adjacent core material of the component. As the added heat builds up more in these areas than in other areas, less energy for melting the powder is necessary. In case of unchanged energy input, the projections tend to deform. This effect may be exploited during the thread forming by processing the Downskin regions $A_{down}$ of the insert thread 16 with reduced energy per unit length $E_S$ compared to Upskin regions $A_{up}$.

The Upskin regions $A_{up}$ are provided adjacent to the Downskin regions $A_{down}$. This becomes obvious when constructing the insert thread 16 in the component opening 12 according to FIG. 3.

In this context, Upskin region $A_{up}$ refers to the upper surface of an additively manufactured component which is directed to the laser beam. The construction takes place on material that is already solidified. By that, a high heat dissipation from the melted material zone via underlying melted and already rigid powder material or core material is guaranteed. With respect to the insert thread 16, the energy per unit length when processing the Upskin regions $A_{up}$ may be increased to or even beyond the energy per unit length level for block-like areas 26.

In the additive manufacturing methods with adaptation of the energy per unit length $E_S$ of the laser to selected geometry areas, geometry areas with Upskin regions $A_{up}$ and/or with Downskin regions $A_{down}$ may be selected from the three-dimensional component drawing. The energy per unit length $E_S$ of the laser beam L may be reduced for selected Downskin regions $A_{down}$ of the insert thread 16. The reduction of the energy per unit length $E_S$ may take place compared to Upskin regions $A_{up}$ and/or to block-like portions 26 of the component 10 where no overhangs are present.

The energy per unit length $E_S$ of the laser beam L is determined according to $E_S = P_L/V_S$ (see above). In order to reduce the energy per unit length $E_S$ of the laser beam L, the laser power $P_L$ of the laser beam L may be reduced.

According to a further configuration of the present disclosure, the laser power $P_L$ for Downskin regions $A_{down}$ may be multiplied with a correction factor $\delta_L$. The correction factor $\delta_L$ may have a value in the range from $0.7 \leq \delta_L \leq 0.99$.

According to a further adaptation of the energy per unit length $E_S$ of the laser beam L, the scan speed $v_S$ of the laser beam L may be changed (see FIG. 3). Depending on the scan speed $v_S$ with which the laser beam L moves over the powder and applies its energy into the powder material at the point of impingement 24, the powder is solidified. When the laser beam moves faster, less energy is transmitted onto the powder than in the case when the laser would move slower.

According to different embodiments of the present disclosure, both the adaptation of the laser power $P_L$ and the adaptation of the scan speed $v_S$ of the laser beam L may be carried out alone or in combination.

Therefore, for establishing Downskin regions $A_{down}$ that the laser power may be adapted with the help of the above correction factor $\delta_L$. The scan speed $v_S$ of the laser beam L may be increased in addition to that.

The adaptation of the laser power $P_L$ and the scan speed $v_S$ may take place compared with the solidification of block-like portions 26 of the component 10.

As an example, the energy per unit length $E_S$ of the laser beam L with real figures is calculated according to, for example, the following equation:

$$E_{S,down} = \frac{P_L \times \delta_L}{V_s} = \frac{270[Ws] \times 0.7}{0.8 \,[m]} = 236.25 \left[\frac{J}{m}\right]$$

The above-described additive manufacturing methods may be carried out with the help of a known laser sinter method or laser melting method with plastic powder or with metal powder.

The above-described additive manufacturing methods according to their embodiments may be combined with each other. This means that in addition to a geometric adaptation of the additively manufactured insert thread in the component, an energetic adaptation is used during manufacturing of the component to be manufactured additively.

After the additive manufacturing of the component 10 with insert thread 16, a wire thread insert 30 is screwed into the component opening 12. The combination of insert thread 16 in the additively manufactured component 10 and wire thread insert 30 screwed into it or installed in it may form a standard thread in order to screw a thread bolt into the component opening 12 with insert thread 16 and wire thread insert 30.

Accordingly, the present disclosure provides a component compound consisting of a first additively manufactured component 10 with an insert thread 16, a wire thread insert 30 installed in the insert thread 16 and a second component 40 with a through-opening 42 and a screw S connecting these two components. The screw S may have a screw head and a screw shaft, with the screw shaft extending through the through-opening 42 of the second component 40 and the thread of the screw shaft being screwed together with the first component 10 via the wire thread insert 30 that is arranged in the insert thread 16.

According to an embodiment of the present disclosure, the outer thread may comprise a nominal diameter d on the shaft of the screw and the insert thread 16 comprises a core diameter Dim according to $D_{1HC} \geq d + 0.46 \times P$. For the flank angle $\alpha$ of the insert thread 16, an angle in the range from $80° > \alpha > 60°$ may be provided.

The invention claimed is:

1. An additive manufacturing method of a component with a thread opening and an insert thread arranged to its radial inner wall,
   which is adapted to a wire thread insert to be received for the purpose of reinforcing the thread, so as to form a standard thread from the insert thread and wire thread insert, with the manufacturing method including the following steps:
   providing a three-dimensional component drawing with the thread opening and the insert thread arranged in there, which is defined by $$D_{HC} \geq D_{HCmin} = d + 0.75 \times \frac{P}{\tan\left(\frac{\alpha}{2}\right)}$$

$$D_{1HC} \geq D_{1HCmin} = d + 0.125 \times \frac{P}{\tan\left(\frac{\alpha}{2}\right)}$$

$$D_{1HC} \leq D_{1HCmax} = d + 0.125 \times \frac{P}{\tan\left(\frac{\alpha}{2}\right)} + 0.373 \times P - 0.192 \times P^{1.21}$$

$$P_{HC} = (D_{HCmin} - D_{1HCmin}) \times 1.6 \times \tan\left(\frac{\alpha}{2}\right)$$

with
- d nominal diameter of the screw thread to be received in the insert thread with wire thread insert
- α flank angle of the screw thread to be received in the insert thread with wire thread insert
- P pitch of the screw thread to be received in the insert thread with wire thread insert
- $D_{HC}$ nominal diameter of the insert thread
- $D_{HC\ min}$ smallest nominal diameter of the insert thread
- $D_{1HC}$ core diameter of the insert thread
- $D_{1HC\ min}$ smallest core diameter of the insert thread
- $D_{1HC\ max}$ largest core diameter of the insert thread
- $P_{HC}$ pitch of the insert thread adapting of dimensions of the insert thread to the additive manufacturing with the help of correction factors,
converting the three-dimensional component drawing with the adapted dimensions into a layer model for the additive manufacturing and
additively manufacturing of the three-dimensional component with connected layers of material to form the three-dimensional component according to the layer model.

2. The manufacturing method according to claim 1, in which the adapting of the dimensions of the insert thread is made by expanding at least one of the following sizes: nominal diameter $D_{HC}$, core diameter $D_{1HC}$, flank angles $\alpha_{HC}$ and pitch $P_{HC}$.

3. The manufacturing method according to claim 2, in which the adapting of the nominal diameter $D_{HC}$ to an additive nominal diameter $D_{AM}$, the adapting of the core diameter $D_{1HC}$ to an additive core diameter $D_{1AM}$, the adapting of the flank angle $\alpha_{HC}$ to an additive flank angle $\alpha_{AM}$ and the adapting of the pitch $P_{HC}$ to an additive pitch $P_{AM}$ take place on the basis of the following equations:

$$D_{AM}=D_{HC}*\delta$$

$$D_{1AM}=D_{1HC}*\delta_1$$

$$\alpha_{AM}=\alpha_{HC}*\delta_\alpha$$

$$P_{AM}=P_{HC}*\delta_P$$

wherein $\delta$, $\delta_1$, $\delta\alpha$, $\delta_P$ are corresponding correction factors for the nominal diameter, the core diameter, the flank angle and the pitch.

4. The manufacturing method according to claim 3, wherein the correction factors have the following value ranges:

| correction factor: | value range: |
|---|---|
| δ | 1.04-1.25 |
| δ₁ | 1.04-1.25 |
| δα | 1.04-1.25 |
| δP | 1.04-1.25. |

5. The manufacturing method according to claim 1, wherein for metric threads with α=60°, the above equations are applicable for d=2; 2.5; 3; 3.5; 4; 4.5; 5; 6; 7; 8; 9; 10; 11; 12; 14; 16; 18; 20 [mm].

6. The manufacturing method according to claim 5, wherein for metric threads with α=60°, the above equations are applicable for P=0.45; 0.5; 0.6; 0.7; 0.75; 0.8; 1; 1.25; 1.5; 1.75; 2; 2.5; 3 [mm].

7. The manufacturing method according to claim 1, wherein for inch threads with α=60°, the above equations are applicable for d=0.086; 0.099; 0.112; 0.125; 0.138; 0.164; 0.19; 0.216; 0.25; 0.3125; 0.375; 0.4375; 0.5; 0.5625; 0.625; 0.75; 0.875 [inch].

8. A manufacturing method of an additively manufactured component with a wire thread insert comprising the following steps:
providing an additively manufactured component with an insert thread according to claim 1, and
rotating a wire thread insert into the insert thread of the additively manufactured component whereby the diameter of the wire thread insert is reduced in comparison with a state in which the wire thread insert is not screwed in.

9. The manufacturing method according to claim 8, with the further step:
screwing of a screw S with a nominal diameter d into a component opening of the additively manufactured component into the wire thread insert in the insert thread.

10. An additively manufactured component with a thread opening and an insert thread arranged to a radial inner wall of the thread opening, in which a wire thread insert is arranged,
wherein the additively manufactured component is manufactured according to a manufacturing method including the following steps:
providing a three-dimensional component drawing with the thread opening and the insert thread arranged in there, which is defined by $$D_{HC} \geq D_{HC\ min} = d + 0.75 \times \frac{P}{\tan\left(\frac{\alpha}{2}\right)}$$

$$D_{1HC} \geq D_{1HC\ min} = d + 0.125 \times \frac{P}{\tan\left(\frac{\alpha}{2}\right)}$$

$$D_{1HC} \leq D_{1HC\ min} = d + 0.125 \times \frac{P}{\tan\left(\frac{\alpha}{2}\right)} + 0.373 \times P - 0.192 \times P^{1.21}$$

$$P_{HC} = (D_{HC\ min} - D_{1HC\ min}) + 1.6 \times \tan\left(\frac{\alpha}{2}\right)$$

with
- d nominal diameter of the screw thread to be received in the insert thread with wire thread insert
- α flank angle of the screw thread to be received in the insert thread with wire thread insert
- P pitch of the screw thread to be received in the insert thread with wire thread insert
- $D_{HC}$ nominal diameter of the insert thread
- $D_{HC\ min}$ smallest nominal diameter of the insert thread
- $D_{1HC}$ core diameter of the insert thread
- $D_{1HC\ min}$ smallest core diameter of the insert thread
- $D_{1HC\ max}$ largest core diameter of the insert thread
- $P_{HC}$ pitch of the insert thread adapting of dimensions of the insert thread to the additive manufacturing with the help of correction factors,
converting the three-dimensional component drawing with the adapted dimensions into a layer model for the additive manufacturing, and
additively manufacturing the three-dimensional component with connected layers of material to form the three-dimensional component according to the layer model.

11. The component according to claim 10 which is manufactured out of plastic material or of metal by means of a laser sinter method or laser melting method.

12. A component connection,
having the following features:
a first additively manufactured component with an insert thread, wherein the additively manufactured component is an additively manufactured component according to a manufacturing method wherein the component has a thread opening and the insert thread is arranged to its radial inner wall, which is adapted to a wire thread insert to be received for the purpose of reinforcing the thread, so as to form a standard thread from the insert thread and wire thread insert, with the manufacturing method including the following steps:
providing a three-dimensional component drawing with the thread opening and the insert thread arranged in there, which is defined by $$D_{HC} \geq D_{HC\ min} = d + 0.75 \times \frac{P}{\tan\left(\frac{\alpha}{2}\right)}$$

$$D_{1HC} \geq D_{1HC\ min} = d + 0.125 \times \frac{P}{\tan\left(\frac{\alpha}{2}\right)}$$

$$D_{1HC} \leq D_{1HC\ min} = d + 0.125 \times \frac{P}{\tan\left(\frac{\alpha}{2}\right)} + 0.373 \times P - 0.192 \times P^{1.21}$$

$$P_{HC} = (D_{HC\ min} - D_{1HC\ min}) + 1.6 \times \tan\left(\frac{\alpha}{2}\right)$$

with
d nominal diameter of the screw thread to be received in the insert thread with wire thread insert
α flank angle of the screw thread to be received in the insert thread with wire thread insert
P pitch of the screw thread to be received in the insert thread with wire thread insert
DHC nominal diameter of the insert thread
DHC min smallest nominal diameter of the insert thread
D1HC core diameter of the insert thread
D1HC min smallest core diameter of the insert thread
D1HC max largest core diameter of the insert thread
PHC pitch of the insert thread
adapting of dimensions of the insert thread to the additive manufacturing with the help of correction factors,
converting the three-dimensional component drawing with the adapted dimensions into a layer model for the additive manufacturing, and
additively manufacturing the three-dimensional component with connected layers of material to form the three-dimensional component according to the layer model,
wherein the component connection further comprises:
a wire thread insert arranged in the insert thread,
a second component with a through opening and a screw S with a head,
a shaft and a thread arranged on the shaft,
wherein the shaft extends through the through opening and the thread of the shaft is screwed together with the first component via the wire thread insert that is arranged in the insert thread.

13. The component connection according to claim 12, in which the thread has a nominal diameter d on the shaft of the screw S and the insert thread has a core diameter $D_{1HC}$ according to $D_{1HC} \geq d+0.46 \times P$.

* * * * *